United States Patent
Kishi

(10) Patent No.: US 8,176,550 B2
(45) Date of Patent: May 8, 2012

(54) AUTHENTICATION-CAPABLE APPARATUS AND SECURITY SYSTEM

(75) Inventor: Nobuya Kishi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1253 days.

(21) Appl. No.: 11/866,030

(22) Filed: Oct. 2, 2007

(65) Prior Publication Data

US 2008/0109900 A1    May 8, 2008

(30) Foreign Application Priority Data

Oct. 3, 2006  (JP) ................................ 2006-272309

(51) Int. Cl.
G06F 21/00    (2006.01)

(52) U.S. Cl. .............. 726/21; 713/182; 713/168; 726/7; 705/5; 709/219; 709/220

(58) Field of Classification Search .................... 726/21
See application file for complete search history.

(56) References Cited

U.S. PATENT DOCUMENTS

| 5,606,615 | A | * | 2/1997 | Lapointe et al. ............... 713/185 |
| 5,629,981 | A | * | 5/1997 | Nerlikar ........................ 713/168 |
| 5,652,830 | A | * | 7/1997 | Yamamoto et al. ........... 358/1.16 |
| 6,009,523 | A | * | 12/1999 | Owaki et al. ..................... 726/21 |
| 6,289,457 | B1 | * | 9/2001 | Bishop et al. ...................... 726/4 |
| 6,356,941 | B1 | * | 3/2002 | Cohen ........................... 709/219 |
| 7,475,812 | B1 | * | 1/2009 | Novozhenets et al. ........ 235/382 |
| 2001/0034623 | A1 | * | 10/2001 | Chung ............................... 705/5 |
| 2003/0097586 | A1 | * | 5/2003 | Mok ............................ 713/200 |
| 2003/0227651 | A1 | * | 12/2003 | Mathieson .................... 358/1.16 |
| 2005/0216746 | A1 | * | 9/2005 | Saika ............................. 713/182 |
| 2006/0197972 | A1 | * | 9/2006 | Hayashi ....................... 358/1.14 |
| 2007/0176739 | A1 | * | 8/2007 | Raheman ...................... 340/5.64 |
| 2007/0288610 | A1 | * | 12/2007 | Saint Clair et al. ........... 709/220 |

FOREIGN PATENT DOCUMENTS

| JP | 11-174920 | 7/1999 |
| JP | 2003-288323 | 10/2003 |
| JP | 2004-302875 | 10/2004 |
| JP | 2006-071684 | 3/2006 |
| JP | 2006-097386 | 4/2006 |

OTHER PUBLICATIONS

Ricoh Aficio Common Security Features Guide|http://www.oit.uci.edu/security/RicohCommonSecurityFeaturesGuide.pdf|Ricoh Corporation|Version 11|2009|pp. 1-27.*

* cited by examiner

Primary Examiner — Taghi Arani
Assistant Examiner — Mahfuzur Rahman
(74) Attorney, Agent, or Firm — David G. Conlin; Steven M. Jensen; Edwards Wildman Palmer LLP

(57) ABSTRACT

The place where a user performs personal authentication includes a room into which entry is authenticated, and an apparatus for use of which authentication input (login and logout) is performed. In such situation, it will take at least a moving time for a user to perform authentication input at a certain location and thereafter to perform authentication input at another apparatus of a different location. Therefore, the present invention provides an authentication-capable apparatus whereby the authentication input by the aforementioned user (the same user) at a different place is inhibited within the aforementioned moving time, thereby preventing "spoofing" by an unauthorized user.

2 Claims, 10 Drawing Sheets

FIG. 2

| AUTHENTICATION CODE OF ROOM | NOTIFICATION DESTINATION | USER | USE STATE OF APPARATUS | INHIBITION TIME |
|---|---|---|---|---|
| 3929 | IP ADDRESS 192.168. XX. XXX | ADMINISTRATOR: MR. A | A | INHIBITED |
| 1974 | IP ADDRESS 192.168. XX. OOX | PLANNING 1: MR. B | — | INHIBITED |
| 3722 | IP ADDRESS 192.168. XX. XOX | PLANNING 1: MR. Z | B | INHIBITED |
| 8929 | IP ADDRESS 192.168. XX. OXO | PLANNING 1: MR. C | — | NON-INHIBITED |

FIG. 3

| AUTHENTICATION CODE OF ROOM | AUTHENTICATION CODE OF APPARATUS | NOTIFICATION DESTINATION | USER | USE STATE OF APPARATUS | INHIBITION TIME |
|---|---|---|---|---|---|
| 13929 | 3929 | IP ADDRESS 192.168. XX. XXX | ADMINISTRATOR: MR. A | A | INHIBITED |
| 11974 | 1974 | IP ADDRESS 192.168. XX. OOX | PLANNING 1: MR. B | — | INHIBITED |

| | G1 | APPARATUS A | APPARATUS B | APPARATUS C | APPARATUS D | G2 | APPARATUS E | APPARATUS F |
|---|---|---|---|---|---|---|---|---|
| G1 | | 25 | 110 | 40 | 210 | | | |
| APPARATUS A | 25 | | 100 | 50 | 200 | | | |
| APPARATUS B | 110 | 100 | | 50 | 100 | | | |
| APPARATUS C | 40 | 50 | 50 | | 100 | | | |
| APPARATUS D | 210 | 200 | 100 | 100 | | | | |
| G2 | | | | | | | 25 | 60 |
| APPARATUS E | | | | | | 25 | | 70 |
| APPARATUS F | | | | | | 60 | 70 | |

(B) (SEC)

| | G1 | APPARATUS A | APPARATUS B | APPARATUS C | APPARATUS D | G2 | APPARATUS E | APPARATUS F |
|---|---|---|---|---|---|---|---|---|
| G1 | | 22.5 | 99 | 36 | 189 | | | |
| APPARATUS A | 22.5 | | 90 | 45 | 180 | | | |
| APPARATUS B | 99 | 90 | | 45 | 90 | | | |
| APPARATUS C | 36 | 45 | 45 | | 90 | | | |
| APPARATUS D | 189 | 180 | 90 | 90 | | | | |
| G2 | | | | | | | 22.5 | 54 |
| APPARATUS E | | | | | | 22.5 | | 63 |
| APPARATUS F | | | | | | 54 | 63 | |

FIG. 11

| AUTHENTICATION CODE OF ROOM | AUTHENTICATION CODE OF APPARATUS | NOTIFICATION DESTINATION | USER | USE STATE OF APPARATUS | INHIBITION TIME | INHIBITION |
|---|---|---|---|---|---|---|
| 13929 | 3929 | IP ADDRESS 192.168.XX.XXX | ADMINISTRATOR: MR. A | A | INHIBITED | LOGOUT |
| 11974 | 1974 | IP ADDRESS 192.168.XX.OOX | PLANNING 1: MR. B | | INHIBITED | END OF JOB |

AUTHENTICATION-CAPABLE APPARATUS AND SECURITY SYSTEM

BACKGROUND OF THE INVENTION

1. Field of the Invention

The present invention relates to an authentication-capable apparatus which can authenticate users.

2. Description of the Related Art

As this type of authentication-capable apparatus, Japanese Patent Laid-Open No, 11-174920 discloses a digital copying machine in which when a predetermined reference time is exceeded after a keycard is set, it is judged that the set keycard has been left standing for a long period of time, and the keycard is temporarily invalidated inhibiting the use thereof.

In the Japanese Patent Laid-Open No. 11-174920, since not only the authenticated user, but also another person is allowed to use the apparatus within the reference time, unauthorized uses by an outsider may occur.

In order to prevent such unauthorized uses, Japanese Patent Laid-Open No. 2006-71684 discloses an authentication-capable apparatus in which when a user, who is authenticated through ID input or card key setting, uses another external apparatus while desectioning from the authentication-capable apparatus, the use of the authentication-capable apparatus is restricted even within a reference time thereby reducing the time period during which unauthorized use or misuse may occur.

On the other hand, while a user, who has performed authentication input at an authentication-capable apparatus of a certain location, is away from the apparatus, an unauthorized user may steal a user ID or a keycard and may pretend to be the authenticated user to use it without authorization at an apparatus of a different location.

In such a case, the authentication-capable apparatus according to Japanese Patent Laid-Open No. 2006-71684 has a disadvantage in that an unauthorized user is allowed to use another apparatus, while an authorized user who has made an authentication input is restricted from using the authentication-capable apparatus.

In view of the above described circumstances, it is an object of the present invention to provide an authentication-capable apparatus which can prevent "spoofing" by unauthorized users, and a security system thereof.

SUMMARY OF THE INVENTION

Specifically, the place where a user performs personal authentication includes a room into which entry is authenticated, and an apparatus for use of which authentication input (login and logout) is performed. In such situation, it will take at least a moving time for a user to perform authentication input at a certain location and thereafter to perform authentication input at another apparatus of a different location. It is intended in the present invention that within this moving time, the authentication input by the aforementioned user (the same user) at another place is inhibited.

That is, the present invention is characterized in that after authentication input for login of a user is performed at an authentication-capable apparatus based on user information, authentication by the same user at another apparatus is inhibited for a predetermined time.

According to the above described configuration, it will take at least a moving time for a user to perform authentication input at a certain location and thereafter to perform authentication input at an apparatus of a different location. With the moving time set as a predetermined time period, authentication input at another place by the same user cannot occur. Therefore, if there is authentication input within the predetermined time, it can be judged to be "spoofing" by an unauthorized user and it is possible to inhibit the use of the apparatus, thereby improving security.

In this case, the authentication-capable apparatus, for example, a digital composite machine, which is connectable with external apparatuses, is characterized by including an authentication section which authenticates a user based on user information to allow the use of the apparatus, a use state confirmation section which confirms the use state of a user at another apparatus, and a use restriction section which, after an authentication input by user at another apparatus is confirmed by the above described use state confirmation section, inhibits authentication input by the same user for a predetermined time period.

According to the above described configuration, since the use state confirmation section receives the use state of the user at other apparatuses, it is possible to keep track of the use state of the other apparatuses. On account of this, when there is authentication input operation at the own apparatus by the same user, it is judged to be authentication input operation by an unauthorized user if it is within the predetermined time period. Thus, it is possible to inhibit the authentication input (login and logout), thereby restricting the use.

In a security system in which an authentication-capable apparatus is installed in a room provided with an entry authentication section for authenticating the entry into the room, and in which an entry authentication notification by the entry authentication section can be notified to the authentication-capable apparatus; the time needed for a user, who has been authenticated for entry by the entry authentication section, to move to the apparatus from the entry is set as a predetermined time period, and after an entry authentication of the aforementioned user is input, the authentication at the aforementioned apparatus by the same user is inhibited for the predetermined time period, thereby restricting the use of an unauthorized user.

The authentication-capable apparatus, which can communicate with the above described entry authentication section, comprises an authentication section which authenticates a user based on user information to allow the use of the apparatus, a receiver section which receives the authentication information at the entry authentication section, and a use restriction section which, after an entry authentication by the receiver section, inhibits the authentication by the same user for a predetermined time period, wherein within the predetermined time period after the user has entered the room and before he/she moves to the authentication-capable apparatus, when there is authentication input by the same user, it is judged to be "spoofing" by an unauthorized user, thereby inhibiting the authentication input. This will improve security.

Moreover, the measurement of the predetermined time period can adopt various methods such as starting from (a) when a logout operation by a user is performed, (b) when a last input operation by a user is performed, (c) when an instruction operation of job start by a user is detected, and (d) when an operation of job end by a user is detected.

Further, when the authentication by the same user within the predetermined time period is confirmed, it is possible to further improve security by notifying that to specific other apparatuses (for example, the terminal for the administrator).

As so far described, according to the present invention, since after authentication input of a user is performed based on user information at an authentication-capable apparatus, the authentication at another apparatus by the same user is inhibited for a predetermined time period, when authentication input is performed within the predetermined time period, it can be judged to be "spoofing" by an unauthorized user so that the use of the apparatuses is inhibited, thereby improving security.

BRIEF DESCRIPTION OF THE DRAWINGS

FIG. 2 shows a user administration table contained in an authentication server and the like;

FIG. 3 shows a user administration table having room codes and apparatus authentication codes;

FIG. 5(A) shows a distance data table between the entrance of the room and each apparatus specified based on the sketch drawing shown in FIG. 4; and 5(B) shows a time data table to show the time to walk between the entrance of the room and each apparatus;

FIG. 11 is an administration table which shows that a different inhibition condition can be set for each user.

DETAILED DESCRIPTION OF THE PREFERRED EMBODIMENTS

Hereinafter, embodiments of the present invention will be described based on the drawings. The authentication-capable apparatus relating to the present invention will be described by way of an example of a digital composite machine having a plurality of functions; however, the present invention will be applicable to various image processing apparatuses such as, whether or not a digital image processing, a composite machine or a single function machine such as a printer, a copy machine, a scanner, a facsimile machine (FAX), and further to information processing apparatuses including computer, and any apparatus equipped with an authentication function, and a communication function with external apparatuses.

Figure 1:
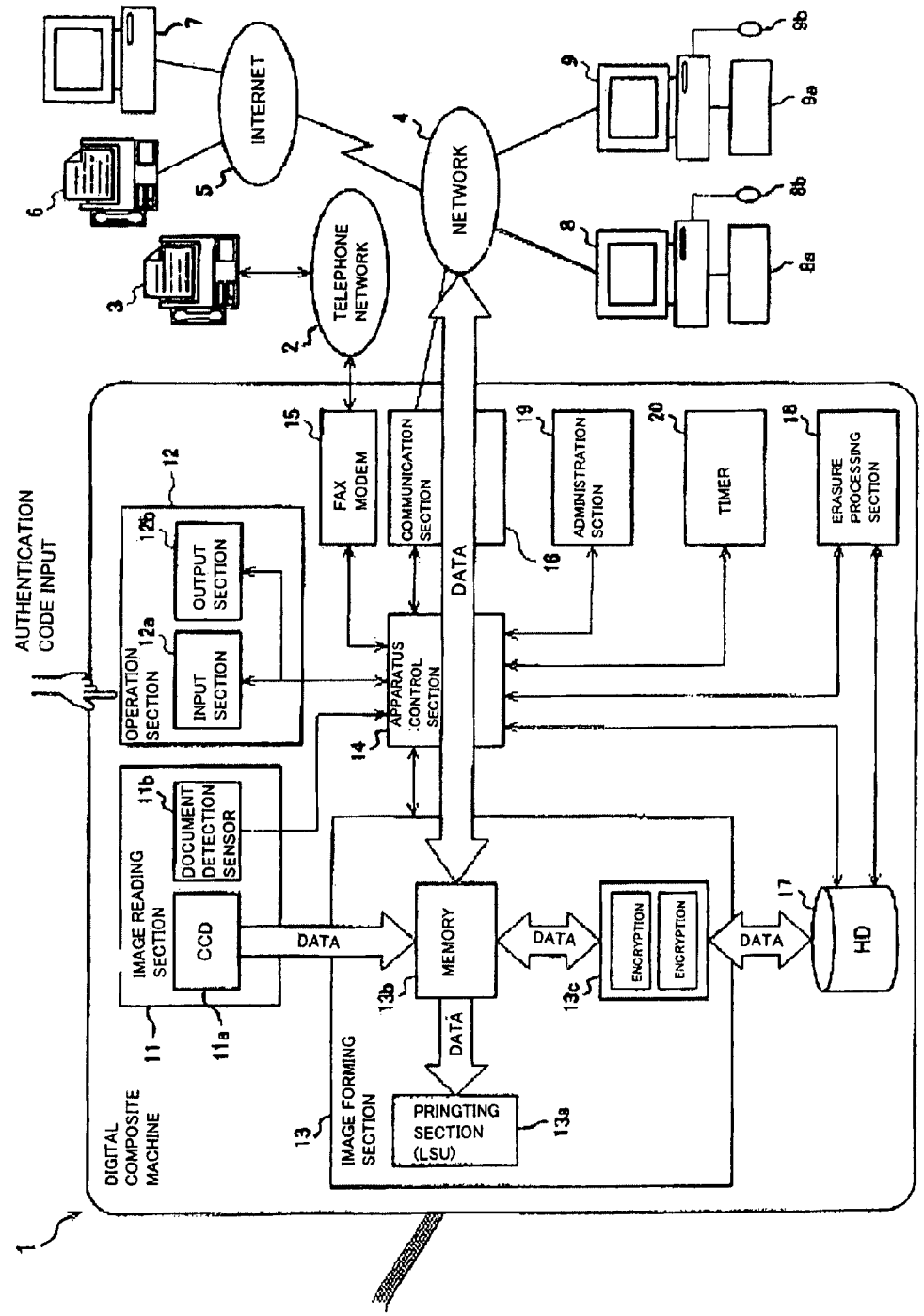
FIG. 1 is a security system diagram made up of a composite machine and externally connected apparatuses according to an embodiment of the present invention.

FIG. 1 shows an example of a system configuration made up of a digital composite machine relating to an embodiment of the present invention, and external connection apparatuses connected to the digital composite machine via a network.

In FIG. 1, reference numeral 1 denotes a digital composite machine as an example of image processing apparatuses, 2 a telephone network, 3 a facsimile machine for the administrator (administrator FAX), 4 a network, 5 an Internet network, 6 an Internet FAX, 7 an external personal computer (external PC), 8 and 9 terminal PCs, 8a a keyboard of PC8, 8b a mouse of PC8, 9a a keyboard of PC9, 9b a mouse of PC9, 11 an image reading section, 12 an operation section, 13 an image forming section, 14 an apparatus control section, 15 a FAX modem, 16 a communication section, 17 a hard disk (HD), 18 an erasure processing section, 19 an administration section, and 20 a timer.

Moreover, the external personal computer (external PC) 8 has a function of an authentication server which manages the information of the user administration table shown in FIGS. 2 and 3, and gives an authentication permission of user. FIG. 2 shows a user administration table in which authentication code information such as "3229", notification destination information such as "IP address 192.168.XX.XXX", user information such as "Administrator: Mr. A" and "Planning 1: Mr. B", apparatus use status such as "A" and "B", and inhibition time such as "inhibited" and "non-inhibited" are recorded. FIG. 3 shows an administration table in which in addition to the administration table of FIG. 2, room code information such as "113929" is recorded.

Furthermore, for the inhibition condition according to the inhibition time of the administration table shown in FIGS. 2 and 3, a different condition may be set for each user. Configuration may be such that the inhibition condition can be set by a user and/or an administrator. FIG. 11 shows an administration table in which the inhibition condition is varied for each user. In FIG. 11, the inhibition condition for "Administrator: Mr. A" is set to be, for example, "logout", and the inhibition condition for "Planning 1. Mr. B" is set to be, for example, "job end"; thus, the condition setting is varied for each user and/or administrator.

Further, as shown in FIG. 1, the digital composite machine 1 is connected with, for example, the FAX 3 used by the administrator by way of the telephone network 2 and with a plurality of terminal PCs 8, 9, . . . via the network 4 such as a LAN (Local Area Network) and WAN (Wide Area Network); and is further connected to the Internet FAX 6, the external PC 7 etc. which are outside the network 4, via the Internet network 5.

The digital composite machine 1 is made up of an image reading section 11 an operation section 12, an image forming section 13, an apparatus control section 14, a FAX modem 1S, a communication section 16, a HD 17, an erasure processing section 18, an administration section 19, a timer 20, and the like.

However, the configuration and the connection form with external apparatuses of the digital composite machine 1 relating to the present invention are not limited to this example, and may be any configuration which is connected with any external apparatus and comprises each section of the present invention described below. The each section described below is not necessarily made up of hardware and may be readily implemented by installing a program, which causes the authentication-capable apparatus such as the digital composite machine 1 to function as the section thereof, in a control section such as the apparatus control section 14 etc. so as to be executed by an arithmetic unit.

The operation section 12 is made up of such as a touch panel which comprises a display section 12b for displaying an operation screen, and an input section 12a for allowing the user to input various settings based on the display.

The image reading section 11 detects the presence and absence of a document by means of a document detection sensor 11b based on the operation at the operation section 12, and reads the document by means of a CCD (Charged-Coupled Device) 11a to output it as image data.

The FAX modem 15 is a modem for performing facsimile communication with the administrator FAX 3. The communication section 16 controls the communication of the digital composite machine 1 with external apparatuses connected via the network 4.

The image forming section 13 temporarily stores the image data read at an image reading section 11 and reception data received at the FAX modem 15 or the communication section 16, and forms an image on the medium such as paper etc. from a printing section 13*a* equipped with a laser scanner unit (LSU).

In the image forming section 13, it is possible to encrypt data such as image data stored in a memory 13*b*, at an encryption processing section 13*c* to store them in a HD 17; and conversely to decrypt the encrypted data stored in the HD 17 and outputs them to external apparatuses through the memory 13*b* via the network 4 or to print out them as medium at the printing section 13*a*.

The erasure processing section 18 performs the processing to erase the data stored in the HD 17 for maintaining security and securing a storage capacity.

The apparatus control section 14, which is a main control section connected to each section described above, centrally controls the operation of the digital composite machine 1 including the exchange of data between each section of the digital composite machine 1 while referring to the administration data from the administration section 19 and the timer time from the timer 20.

The administration section 19 may administer the user administration table of FIGS. 2 and 3 and the IP address of the own machine 1.

The timer 20 clocks the time in a stand-by state of the digital composite machine 1, and notify the time to the apparatus control section 14. Taking an example of control in the apparatus control section 14, the operation section 12 notifies a copy request instructed by the operation input of the user and various recording conditions to the apparatus control section 14, and the apparatus control section 14 displays the operation state etc. of the digital composite machine 1 on the display screen of the display section 12*b* of the operation section 12 and gives instruction of printing processing etc. to the image forming section 13.

As so far described, the digital composite machine 1 is provided in the operation section 12, with an input section 12*a* and a display section 12*b*, and can perform ID input as well as function instruction operation of the digital composite machine 1. In addition to the ID input, an ID card reader which is input with an ID card and reads the information thereof may be provided in the digital composite machine 1.

Figure 6:
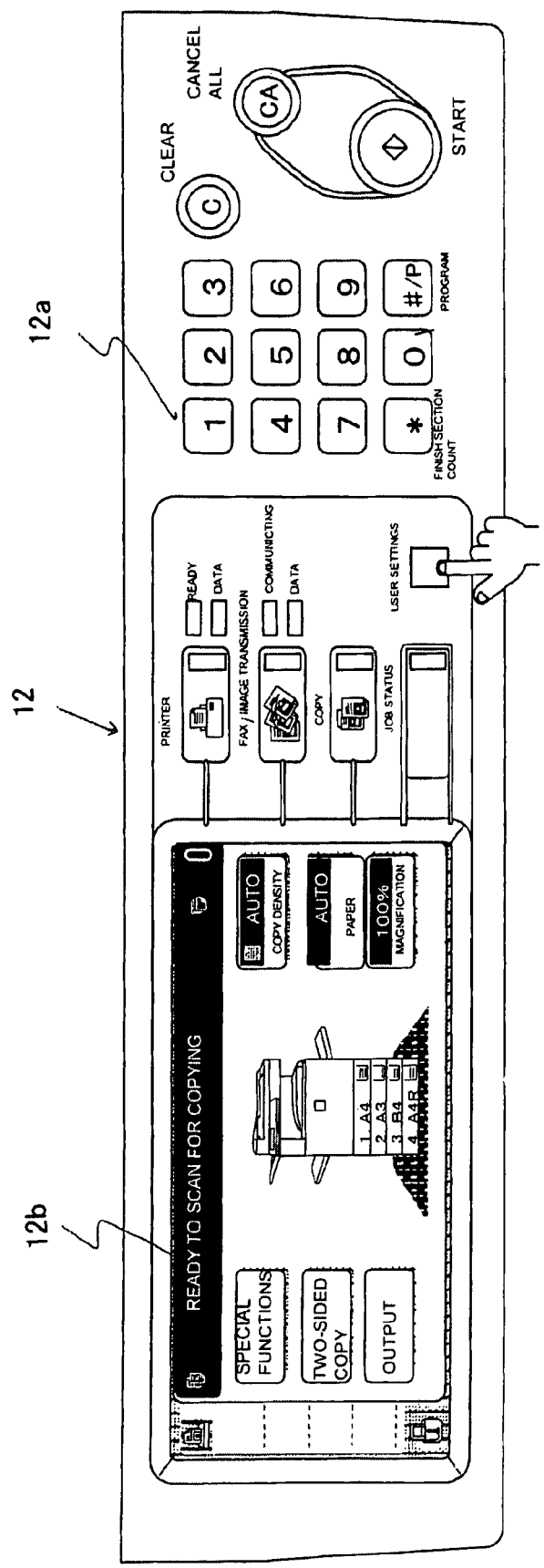
FIG. 6 is a plan view to show the operation screen of each apparatus.

FIG. 6 is a plan view to show the operation section 12. The operation section 12 is provided with an input section 12*a* and a display section 12*b*. The input section 12*a* has a key, a user setting key, a ten-key, a clear key, a start key, an authentication key, etc. for setting a copy mode, a printer mode, a scanner mode, a facsimile mode, etc. Moreover, the input section 12*a* includes a transparent touch panel which is provided in superposition on the display section 12*b*. By operating this touch panel, it is possible to selectively operate the key displayed on the display section 12*b*. The input instructions through the operation of these keys are notified to the apparatus control section 14. Further, the display content in the display section 12*b* in FIG. 6 is that of an initial state.

The digital composite machine 1 relating to the present invention is provided with any type of authentication section to be operated by means of an authentication key etc. The authentication section may be any one which authenticates the user based on user information to allow the use of the own machine 1. The digital composite machine 1 first limits users by means of this authentication section. Further, in the digital composite machine 1, two-way data communications is performed with external apparatuses (PC terminals etc.) by means of the communication section 16. The digital composite machine 1 relating to the present invention is supposed to comprise any type of communication section such as described above.

Further, the digital composite machine 1 comprises a use state confirmation section which confirms the use state by the user of an external apparatus connected to the digital composite machine 1, and a use restriction section which restricts the use of the digital composite machine 1 when use of the external apparatus by this user is confirmed.

Here, the term "restriction" may be predetermined appropriately depending on the use state of the present invention, such as to mean the cancellation of authentication and the use restriction of a specific function.

Moreover, as a further embodiment of the present invention, the use state confirmation section preferably comprises an authentication notification section and a use state receiver section as described below. The authentication notification section notifies to external apparatuses (basically all of such external apparatuses) which are available for the user and are externally connected, of the authentication information which shows that the user authenticated by the authentication section has been authenticated. Upon notification, notification destination of external apparatuses which are available for the user and are externally connected, may be set in advance corresponding to the user information in the digital composite machine 1.

After the notification by the authentication notification section, the use state receiver section receives the information indicating that the external apparatus has been used by the user, as the information indicating the external apparatus uses.

The method of reception may be to access the external apparatus to acquire information or to simply receive the information transmitted from the external apparatus.

Further, the information indicating that the apparatus has been used may be judged from the state such as the driving state of the external apparatus. For example, when the external apparatus is a PC, judgment may be made from a serviceability ratio of CPU, an event that the screen saver being activated becomes deactivated, or a signal resulting from the actuation of various input devices such as a keyboard and a mouse.

Further, in the digital composite machine 1, after authentication input by a user at another apparatus is confirmed by the use state confirmation section, the use restriction section inhibits the authentication of the same user for a predetermined time period to prevent the spoofing by an unauthorized user.

The measurement of the predetermined time may start at various timing such as starting from a) when a logout operation by a user is performed, b) when a last input operation of a user is performed, c) an instruction operation of job start by a user is detected, d) when an operation of job end by a user is detected, and so on.

Further, the digital composite machine 1 is communicably connected with an entry authentication section for authenticating the entry into a room, it receives authentication information at the entry authentication section from the receiver section, and the use restriction section inhibits the authentication by the same user for the predetermined time period after the entry authentication. The predetermined time period in this case can be set corresponding to the moving time of the user from the entrance to the own apparatus.

Figure 4:
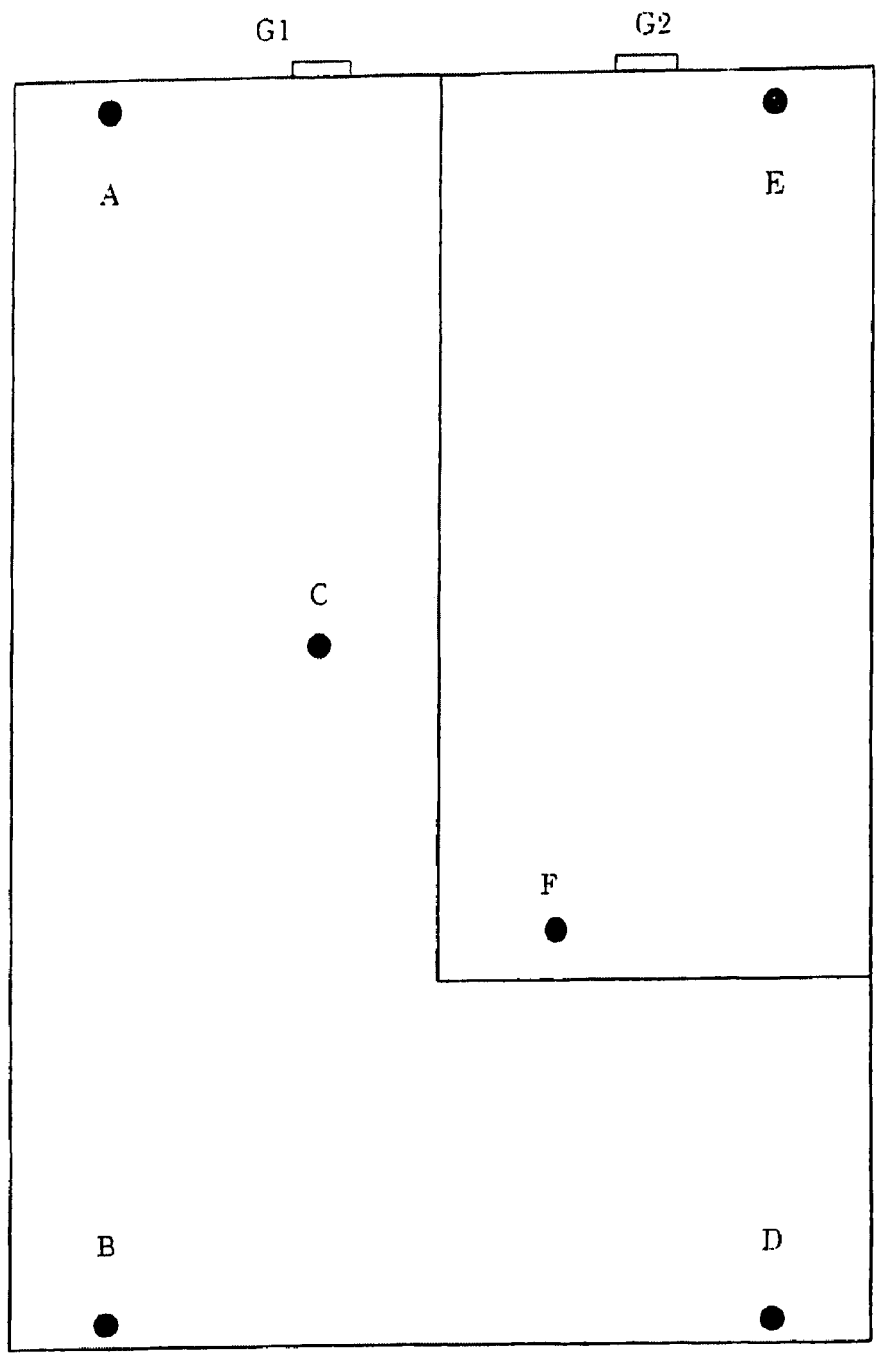
FIG. 4 is a sketch drawing to show a case in which a plurality of authentication-capable apparatuses are installed in two rooms.

FIG. 4 is a sketch drawing to show a case in which a plurality of authentication-capable apparatuses are installed in two rooms. In a first room, four authentication-capable apparatuses A to D are sparsely disposed. In a second room, two authentication-capable apparatuses E and F are sparsely disposed. At the entrance of each room, an entry authentication sections G1, G2 are provided. When authentication of a user by the entry authentication sections G1, G2 is finished, the door at the entrance is automatically opened or the door lock is released.

FIG. 5(A) is a distance data table between the entrance of the room and each apparatus, which are specified based on the sketch drawing shown in FIG. 4 and expressed in meters. For example, the distance from the entrance G1 of the first room to the apparatus A is 25 m, the distance from the entrance G1 to the apparatus B is 110 m, and the distance from the entrance G1 to the apparatus D is 210 m. The distance between the apparatus A and the apparatus B is 100 m.

FIG. 5(B) is a time data table to show the moving times when walking from the entrance of the room to each apparatus Supposing the walking speed of a human to be 4 km per hour, since it is converted to 1.1 m/sec, the moving time can be calculated from the distance table of FIG. 5(A). For example, the time needed to move from the entrance G1 to the apparatus A is 22.5 sec, and the time needed to move from the entrance G1 to the apparatus B is 99 sec.

Based on the administration table of FIG. 5(B), a predetermined time is specified. That is, at the apparatus A, authentication information is received from the entry authentication section G1, and even if there is authentication input by the same user within a predetermined time period (for example, 22.5 seconds) after the entry authentication is performed, this is invalidated, thereby preventing "spoofing" of an unauthorized user.

Further, the security of the digital composite machine 1 can further be improved by providing a notification section which, when another authentication by the same user is confirmed within a predetermined time period, notifies that to other specific apparatuses (for example, the apparatus A, when the apparatus A is a PC for administrator).

Figure 7:
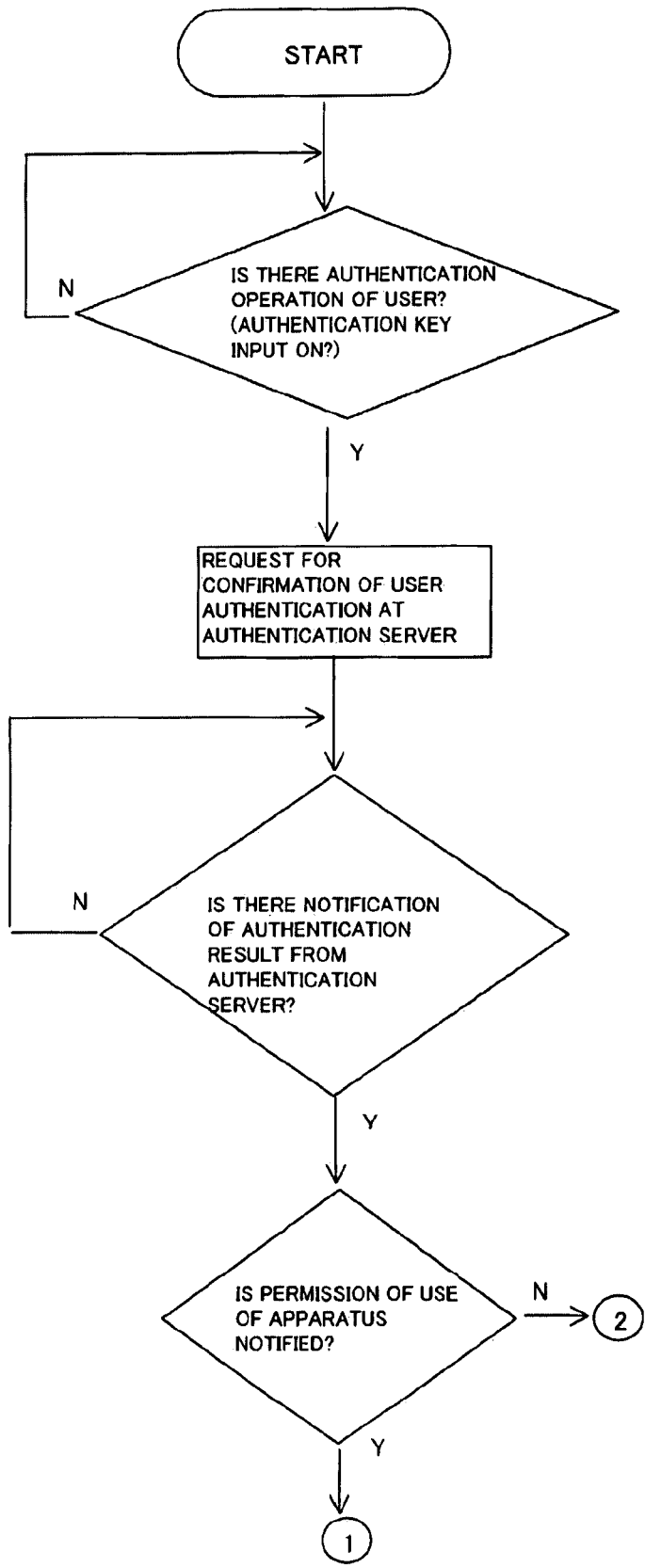
FIG. 7 is a flowchart of authentication processing of the apparatus.

Next, the security system according to the above described authentication function will be described based on the flowchart shown in FIGS. 7 to 10. First, the processing in an apparatus is to be stand-by, as shown in FIG. 7, until there is an authentication operation by a user such as authentication key input by a user. When there is an authentication operation by a user, the apparatus requests the confirmation of the user authentication to the authentication server. The authentication server verifies the user authentication against the user information stored and notifies the authentication result back to the apparatus. When the authentication result is a use permission notification, the process moves to FIG. 8 and the apparatus is unlocked. And the authentication result is a use non-permission notification, the use of the apparatus is restricted.

Figure 8:
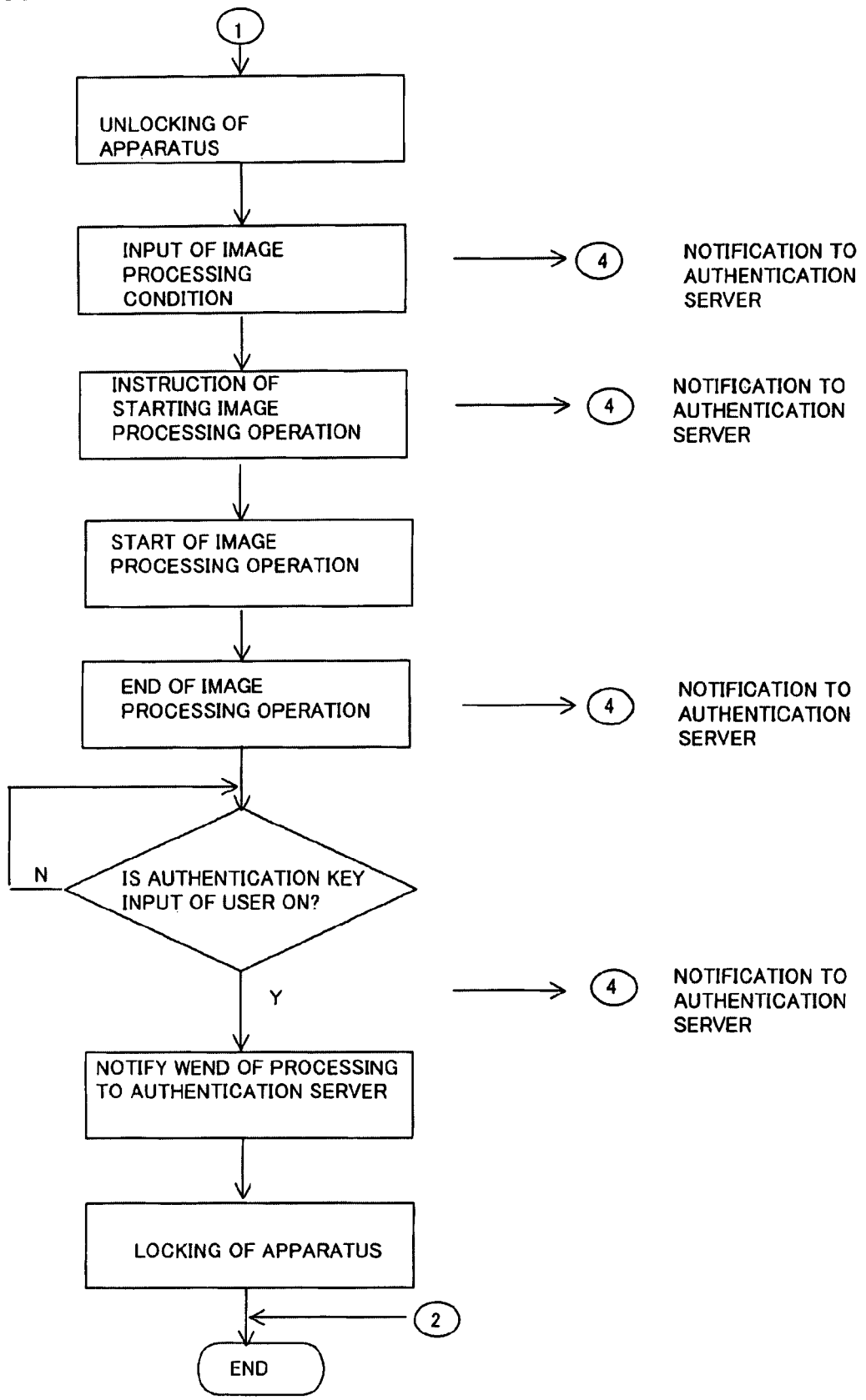
FIG. 8 is a flowchart of the authentication processing of the apparatus to show from the unlocking to locking of the apparatus.

FIG. 8 is a flowchart to show from the unlocking of the apparatus to the locking of the apparatus. When the apparatus is unlocked, an image processing condition is input and an instruction of starting the image processing operation is performed to start the image processing operation. The use state at this moment is notified to the authentication server. After the start of image processing operation, when the image processing operation is finished, the process is on stand-by until an authentication key of a user is input, and when an authentication key of a user is input, the end of processing is notified to the authentication server and the apparatus is locked, thereby terminating the processing.

Figure 9:
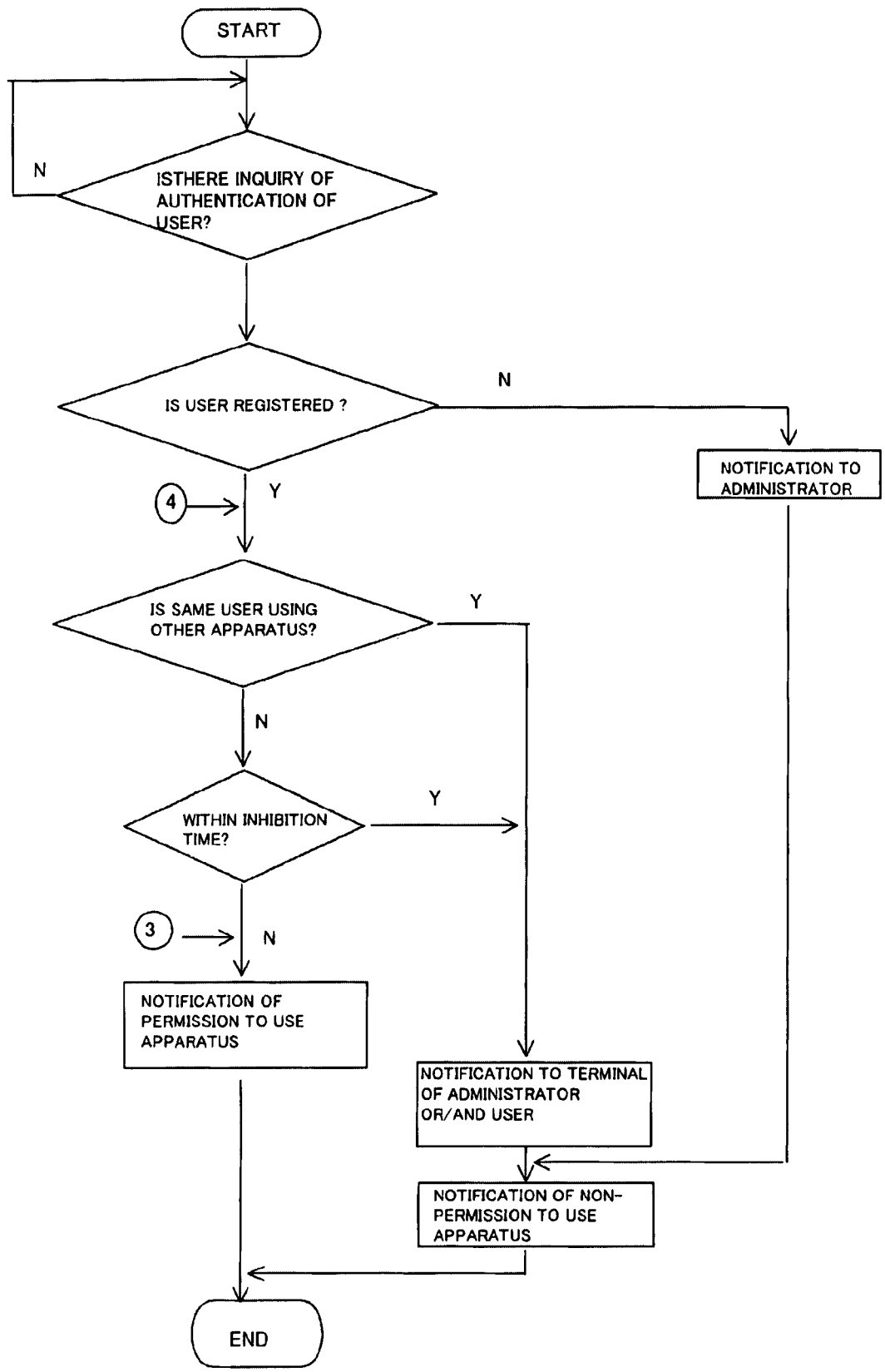
FIG. 9 is a flowchart to show an example of the authentication processing in an authentication server.

FIG. 9 is a flowchart to show an example of the authentication processing in an authentication server. In this example, when there is an authentication inquiry of a user in the authentication server, it is searched whether or not the user is registered from the user code etc., and when the user is unregistered, that is notified to the administrator (PC), and a non-permission of use of the apparatus is notified to the apparatus.

When the user is registered, it is searched whether or not the same user is using any other apparatus, and when using, that is notified to the terminals of the administrator and/or the user and non-permission of use of the apparatus is notified. When the same user is not using any other apparatus, it is judged whether or not it is within the inhibition time.

The inhibition time is a predetermined time after authentication input for login of a user is performed at another apparatus. The measurement of the predetermined time may start at various timing such as starting from a) when a logout operation by a user is performed, b) when a last input operation of a user is performed, c) an instruction operation of job start by a user is detected, d) when an operation of job end by a user is detected, and so on.

Further, as shown in FIG. 8, since the input operation of each user etc. is notified to the authentication server, this will allow the use state of the apparatus to be confirmed.

When, in the digital composite machine 1, a use by the same user at another apparatus within the predetermined time period (inhibition time) is confirmed, that is notified to the terminals of the administrator and/or the user, and notification of non-permission of use of the apparatus is performed. When the user is not using another apparatus within the predetermined time period, permission of use of the apparatus is notified.

Figure 10:
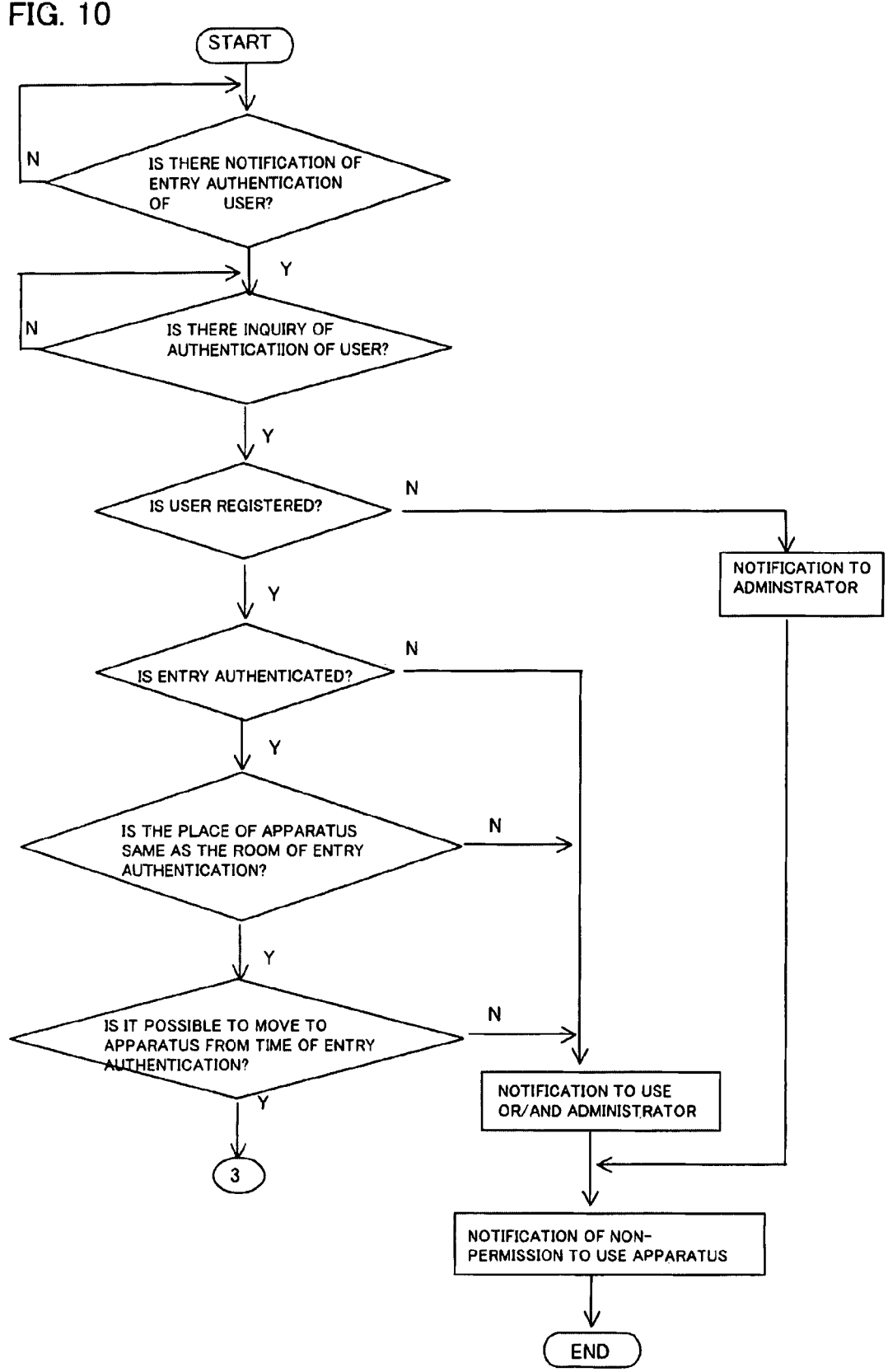
FIG. 10 is a flowchart to show an example of another authentication processing in the authentication server.

FIG. 10 is a processing flowchart of an authentication server in a security system which is communicably connected to an entry authentication section for authenticating the entry into a room. As shown in FIG. 10, the process is on stand-by until a notification of entry authentication of a user is received, and when the notification is received, the process is further on stand-by until there is an inquiry of the authentication of a user at an apparatus. When there is an inquiry of authentication of a user, it is confirmed whether or not the user is registered; and when unregistered, that is notified to the administrator PC and non-permission of use of the apparatus is notified.

When the user is registered, then it is judged whether or not entry authentication has been performed. When the apparatus and the room into which entry authentication is performed are in the same place, it is judged whether the predetermined time period is exceeded by the time period from when the entry authentication is performed to when the inquiry of authentication is performed.

When the predetermined time period is exceeded, permission of use of the apparatus is notified to allow the use of the apparatus. When the entry authentication has not been performed, and when the room into which entry authentication has been performed and the apparatus are not in the same place, and when the time needed to move to the apparatus from when entry authentication is performed is within an inhibition time, since it is highly likely to be spoofing by an unauthorized user, this is notified to the user and/or the administrator PC and the processing to inhibit the use of the apparatus is performed.

In this way, since after the authentication input of login of a user is performed at the authentication-capable apparatus, the authentication by the same user at another apparatus is inhibited for a predetermined time period, if there is authentication input during the predetermined time period, it is judged to be "spoofing" by an unauthorized user, thereby inhibiting the use of the apparatus to improve the security.

What is claimed is:

1. A security system, comprising:
an entry authentication section, which is set at an entrance of a room, for authenticating entry into the room is communicably connected with an authentication-capable apparatus, which is an image processing apparatus, installed in the room via a network,
wherein the entry authentication section verifies a user's authentication code inputted by a user for entrance authentication against a user's authentication code information registered in advance, and when the user's authentication code matches the information registered in advance, allows the user to enter the room by automatically opening a door or releasing a door lock, and entrance permission information of the user is transmitted to the authentication-capable apparatus, and when the user's authentication code does not match the user's authentication code information registered in advance, the user is inhibited from entering the room, and
wherein the authentication-capable apparatus comprises:
an authentication section which verifies the user's authentication code inputted by the user against the user's authentication code information registered in advance; and
a use restriction section which sets a time needed for the user, who has been authenticated for entry by the entry authentication section, to move to the authentication-capable apparatus as a predetermined time period, receives the entrance permission information from the entry authentication section, and inhibits login to the authentication-capable apparatus and restricts use of the authentication-capable apparatus during the predetermined time period, even if the user's authentication code matches the user's authentication code information registered in advance,
wherein when authentication by the same user is confirmed within the predetermined time period, the authentication-capable apparatus notifies the user's authentication code to a specific other apparatus.

2. A security system, comprising:
an entry authentication section, which is set at an entrance of a room, for authenticating entry into the room is communicably connected with an authentication-capable apparatus, which is an image processing apparatus, installed in the room, and
an authentication server which manages information of a user administration table and gives authentication permission of a user via a network,
wherein the authentication server verifies a user's authentication code, which is transmitted from the entry authentication section, inputted by the user for entrance authentication against a user's entrance authentication code information registered for the room in advance, notifies permission or no permission for the user to enter the room to the entry authentication section, and stores entrance permission information of the user when entry to the room is permitted,
the entry authentication section determines that a door at the entrance of the room is automatically opened or a door lock is released based on the notification from the authentication server,
the authentication-capable apparatus is provided with an authentication section that transmits the user's authentication code, which is inputted to the authentication section by the user, to the authentication server,
the authentication server verifies the user authentication code transmitted from the authentication section against the user's authentication code information registered in advance with respect to the user who is allowed to use the authentication-capable apparatus, judges when the user's authentication code matches the information registered in advance that the user is permitted to enter the room, sets a time needed for the user who has been authenticated for entry by the entry authentication section to move to the authentication-capable apparatus as a predetermined time period, and notifies to the authentication-capable apparatus non-permission of use of the apparatus so as to inhibit login to the authentication-capable apparatus and restricts the use of the apparatus during the predetermined time period, even if the user's authentication code matches the user's authentication code information registered in advance, and
the authentication-capable apparatus is provided with a use restriction section, the use restriction section inhibiting login to the authentication-capable apparatus and restricting use of the authentication-capable apparatus based on notification of non-permission of use received from the authentication server,
wherein when authentication by the same user is confirmed within the predetermined time period, the authentication-capable apparatus notifies the user's authentication code to a specific other apparatus.

* * * * *